United States Patent [19]
Peters et al.

[11] Patent Number: 5,984,314
[45] Date of Patent: *Nov. 16, 1999

[54] ROTATABLE SEAL ELEMENT FOR A ROTARY MACHINE

[75] Inventors: Gary P. Peters, Manchester; Robert Gerard Johannus Stirt, South Glastonbury, both of Conn.

[73] Assignee: United Technologies Corp., Hartford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/683,165

[22] Filed: Jul. 18, 1996

Related U.S. Application Data

[63] Continuation of application No. 08/295,193, Aug. 24, 1994, abandoned.

[51] Int. Cl.[6] .................................................. F16J 15/48
[52] U.S. Cl. ..................... 277/417; 277/412; 277/414; 277/418
[58] Field of Search .......................... 415/173.5, 174.5; 277/53, 55, 56, 57, 409, 411, 412, 414, 417, 418

[56] References Cited

U.S. PATENT DOCUMENTS

| | | | |
|---|---|---|---|
| 898,257 | 9/1908 | Parsons et al. | 277/56 |
| 1,505,647 | 8/1924 | Junggren . | |
| 3,339,933 | 9/1967 | Foster | 277/53 |
| 4,351,532 | 9/1982 | Laverty | 277/53 |
| 4,606,102 | 8/1986 | Riethmuller | 415/174.5 |
| 5,143,383 | 9/1992 | Glynn et al. | 277/53 |
| 5,152,666 | 10/1992 | Stripinis et al. . | |
| 5,320,488 | 6/1994 | Meade et al. | 415/174.5 |

FOREIGN PATENT DOCUMENTS

2 159 895A  12/1985  United Kingdom ........... F16J 15/447

Primary Examiner—Daniel G. DePumpo
Attorney, Agent, or Firm—Gene D. Fleischhauer

[57] ABSTRACT

A rotatable seal element 38 is formed of at least two circumferentially continuous rings 48,50. The rings have decreased thickness $T_2$, $T_3$ in the outward direction. Various construction details are developed which effect the level of cyclic fatigue life. In one particular embodiment, the seal element has a flat surface 74 extending inwardly from the sides at the interface between the rings.

11 Claims, 6 Drawing Sheets

ROTATABLE SEAL ELEMENT FOR A ROTARY MACHINE

This application is a continuation of application Ser. No. 08/295,193, filed Aug. 24, 1994, now abandoned.

TECHNICAL FIELD

This invention relates to a rotary machine having a working medium flowpath and a rotatable seal element which extends circumferentially about an axis of rotation. More particularly, this invention relates to seal elements formed of a plurality of stacked rings. It has particular application to gas turbine engines to block the leakage of working medium gases at the boundary of the working medium flowpath.

BACKGROUND OF INVENTION

One example of a rotary machine is a gas turbine engine. The gas turbine engine has a rotor assembly which extends axially through the engine. A stator assembly extends circumferentially about the rotor assembly. A flowpath for working medium gases extends through the engines through the rotor assembly and the stator assembly and is bounded by elements of both assemblies.

The rotor assembly typically includes a rotor disk and a plurality of rotor blades extending radially outwardly across the working medium flowpath. The stator assembly includes an outer case and arrays of stator vanes, or struts, which extend radially inwardly across the working medium flowpath. A seal assembly is provided between the rotor disk of the rotor assembly and the strut of the stator assembly to provide a boundary to the working medium flowpath.

One example of such a construction is shown in U.S. Pat. No. 5,152,666 issued to Stripinis and Walsh entitled Stator Assembly for a Rotary Machine. The seal assembly is shown adjacent reference numerals 148 and 152. The seal assembly includes a circumferentially extending seal land which faces inwardly. The seal land is attached to the stator assembly and is circumferentially continuous. A rotatable seal element extends circumferentially about the axis of rotation $A_r$ of the machine. The rotatable seal element includes a circumferentially continuous support member and a plurality of seal elements which extend radially outwardly from the support member.

The rotatable seal elements are formed of a plurality of stacked rings having sloped transition shoulders between the rings. The outermost ring is referred to as the fin ring and the supporting rings as pedestal rings. The rings become thinner in a direction perpendicular to the circumferential direction as the seal element extends outwardly. This reduces stresses in the seal element by reducing the mass of the seal element. Each rotatable seal element is circumferentially continuous. As a result, the rings are subjected to large hoop stresses as the seal element is rotated about the axis of rotation $A_r$.

Under operative conditions, the rotatable seal element may rub against the seal land, abrading the seal element and generating heat at the region of contact. The thermal and mechanical stresses that result coupled with the very large hoop stresses that result from the high rotational speeds of the rotor assembly may cause a crack to form after the structure has been subjected to cyclic stresses. The cyclic stresses result from mechanical and thermal stresses associated with accelerating the engine from Seal Level Take Off conditions (high rotational speeds, very hot temperatures) and decelerating the engine after cruise to idle descent and shut-off of the engine. The crack grows radially inwardly and at an explosive rate of speed once it extends from the upstream side to the downstream side of the seal element. This is in part due to the action of the hoop stresses acting on the fracture point of the crack as the crack propagates inwardly.

The hoop stresses provide a certain energy which is available to cause the crack to grow. The energy is proportional to the applied hoop stress. For each material, there is a critical factor associated with cyclic fatigue which is referred to as the Critical Stress Intensity Factor ($K_{ic}$). $K_{ic}$ represents the stress intensity at the crack tip at which the crack growth becomes unstable and rupture of the structure occurs in a short number of cycles. $K_{ic}$ is expressed in units of pounds per square inch and inches to the one-half power (psi in$^{1/2}$).

Another important factor is K instantaneous (Ki). Ki is the actual stress intensity factor for a crack. It is related to stress, geometry factors, and crack size. Once Ki exceed $K_{ic}$, the critical stress intensity factor has been exceeded and crack growth becomes unstable and rapid. The crack may grow so rapidly as to propagate itself through the underlying support member, causing fracture of the support member coupled with disintegration of the support member and damage to rotating components downstream. As a result, once a crack starts to form in a rotating knife edge, the knife edge has only a given life and must be replaced. If the crack is missed during regular inspection intervals, the crack may propagate into the underlying support structure with concomitant harmful effects.

Accordingly, scientists and engineers working under the direction of Applicant's Assignee have sought to design seal elements which provide for increased life once a crack begins in the seal element and to provide a means for slowing crack growth at different transitions in seal elements to ensure that regular inspections will discover a crack in the seal element prior to such a catastrophic failure even if one inspection misses the formation of the crack.

DISCLOSURE OF INVENTION

This invention is in part predicated on the recognition that for a given crack size, changing the geometry factor (which effects the value of K instantaneous) may decrease the rate of crack growth and compensate for the increase in crack size which increases the rate of crack growth. This change in geometry factor can be used to reduce the stress per unit area at the crack front by increasing the length of the material through which the crack extends.

This is particularly critical if a horizontal crack exists which extends from one free side of the structure to another free side of the structure. Such a crack is referred to as a "through crack". If a horizontal through crack exists, the crack only has to grow in essentially one direction, across a linear front. The same amount of energy causes more crack growth for a given application of stress because the unit stress per length of crack is higher than if the crack front were longer.

This invention is also in part predicated on the realization that by using the geometry factor to force the crack to curve dramatically at interfaces between the rings of stacked seal elements, the rate of crack growth can be decreased at this location. Thus, if the crack is curved or has several dimensions, the crack growth can be slowed and the crack can be forced to expend energy to grow in several different directions rather than across a single crack front. This gives more area to disperse the stress energy in the structure and results in slower crack growth. One way to take advantage of this phenomena is to use the juncture between stacked rings to insure that as the crack extends itself perpendicular to a surface such that the crack has to bend back on itself creating the longer crack front. In addition, the juncture between the stacked rings then provides a convenient inspection location for determining whether the structure must be replaced.

According to the present invention, a rotatable seal element for a rotary machine extends circumferentially about an axis of rotation and has an inner ring and an outer ring disposed about a circumferentially extending plane, the outer ring extending in a first direction away from a surface of the inner ring, with the surface extending laterally away from the plane and angled such that the surface does not extend inwardly toward the plane at the upstream and downstream sides of the seal element.

In accordance with the present invention, the inner ring is a pedestal and the outer ring is a fin which are disposed symmetrically about a circumferentially extending plane that passes through the locations of the leading edge of the crack front as the crack front passes through the seal element.

A primary feature of the present invention is a seal element which is circumferentially continuous. The seal element includes a support member and a plurality of stacked rings. Each ring is narrower than the rings between it and the support member. In one embodiment, the element consists of an outer ring and an inner ring. The inner ring has a surface which extends laterally with respect to the outer ring and is inclined such that it does not extend away from the outer ring toward the support member. In one embodiment, the outer ring has two sides which converge outwardly at a predetermined angle. Another feature is a fillet radius which extends from one side of the outer ring and to the surface of the inner ring. The surface of the inner ring extends to the side of the inner ring and is either inclined toward the outer ring or is perpendicular to the circumferentially extending plane about which the ring is disposed. In one particular embodiment, the ratio of the height of the outer ring to the thickness of the outer ring at a location adjacent the inner ring is less than or equal to one and one-half. The fillet radius between the outer ring and the inner ring is less than or equal to one-third the thickness of the outer ring and the flat portion of the surface of the inner ring is greater than or equal to one-half the fillet radius.

A primary advantage of the present invention is the cyclic fatigue life of a seal element which results from the geometry of the interface between adjacent rings that causes cracks that form to have to grow in more than one lateral direction at the interface between the rings. Another advantage of the present invention is the predictability of the minimum cyclic life of the seal assembly which is provided by the retardant effect of the interfaces between the stacked rings on the propagation of crack growth. This enables inspection at spaced intervals in the cyclic life of the structure while still ensuring that cracks do not propagate to the support element if one inspection should not discover the crack.

BEST MODE FOR CARRYING OUT THE INVENTION

Figure 1:
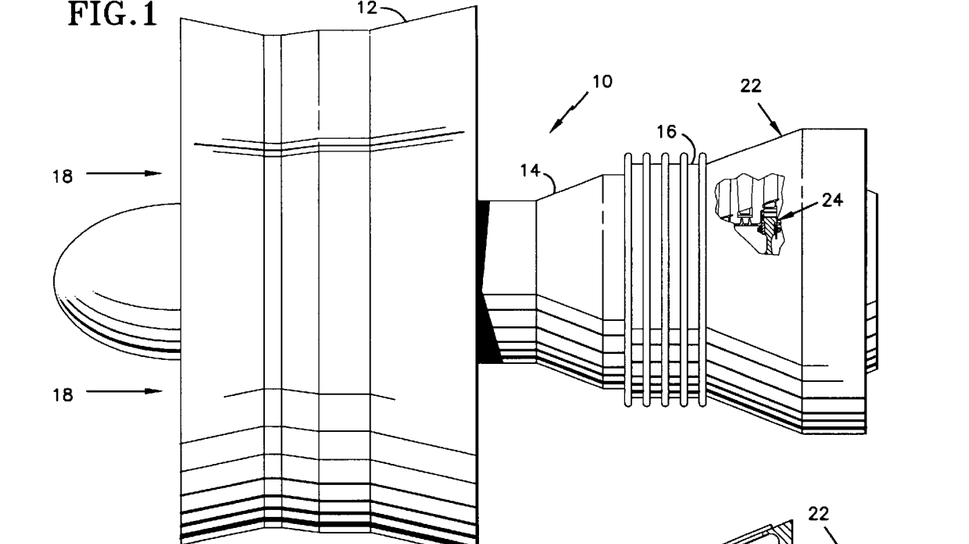
FIG. 1 is a side-elevation view of an axial flow gas turbine engine partly broken away to show a portion of the turbine section of the engine.

FIG. 1 is a side elevation view of an axial flow rotary machine 10. The rotary machine includes a compression section 12 a combustion section 14 and a turbine section 16. A flowpath for working medium gases 18 extends axially through the sections of the engine. A stator assembly 22 extends axially through the engine outwardly of the flowpath to bound the flowpath for working medium gases. A rotor assembly 24 is disposed inwardly of the flowpath for working medium gases.

Figure 2:
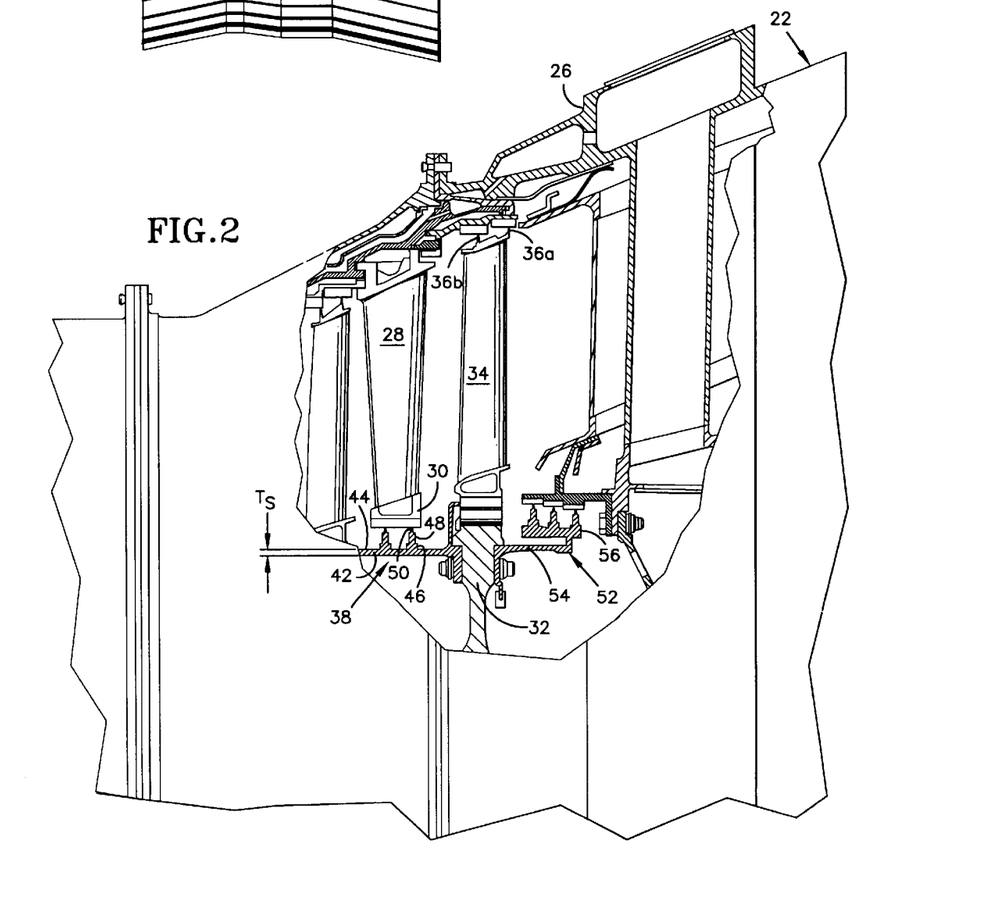
FIG. 2 is an enlarged side elevation view of the portion of the gas turbine engine shown in FIG. 1 and illustrating in cross-section, a plurality of circumferentially continuous, rotatable seal elements.

FIG. 2 is an enlarged view of a portion of the turbine section 16 shown in FIG. 1. The stator assembly 22 includes an outer case 26 and a plurality of stator vanes 28 which extend radially inwardly across the working medium flowpath. The stator vanes are connected by a plurality of circumferentially extending seal land 30 which are spaced radially outwardly of the rotor assembly. The seal land is circumferentially continuous.

The rotor assembly 24 includes a rotor disk 32 and a plurality of rotor blades 34. The rotor blades extend radially outwardly across the working medium flowpath 18 into proximity with the outer case. The rotor blades have a plurality of seal knife edges 36 at the tip of each rotor blade. The knife edges each extend circumferentially for a short distance at the tip of the rotor blade. The adjacent knife edges form a circumferentially extending seal which is not circumferentially continuous and not subjected to hoop stresses.

The rotor assembly 24 also includes a rotatable seal element 38. The seal element has an axially extending support member 42 extending circumferentially about the axis $A_r$. The support member has a surface 44. The seal element has a plurality of stacked rings as represented by the rings 46, 48 and 50 which extend outwardly from the surface of the support member. The support member has a thickness $T_S$ as measured in a direction perpendicular to the surface of the support member adjacent the rings.

The rotor assembly includes a second seal element 52. The second seal element has a first support member 54 which extends axially from the rotor disk 32 and a second support member 56 joined to the first support member. As with the seal element 38, the seal element has a plurality of stacked rings which are circumferentially continuous. The seal elements 38 and 52 are in contrast to the seal elements 36 which are not circumferentially continuous.

Figures 3, 4, 5:
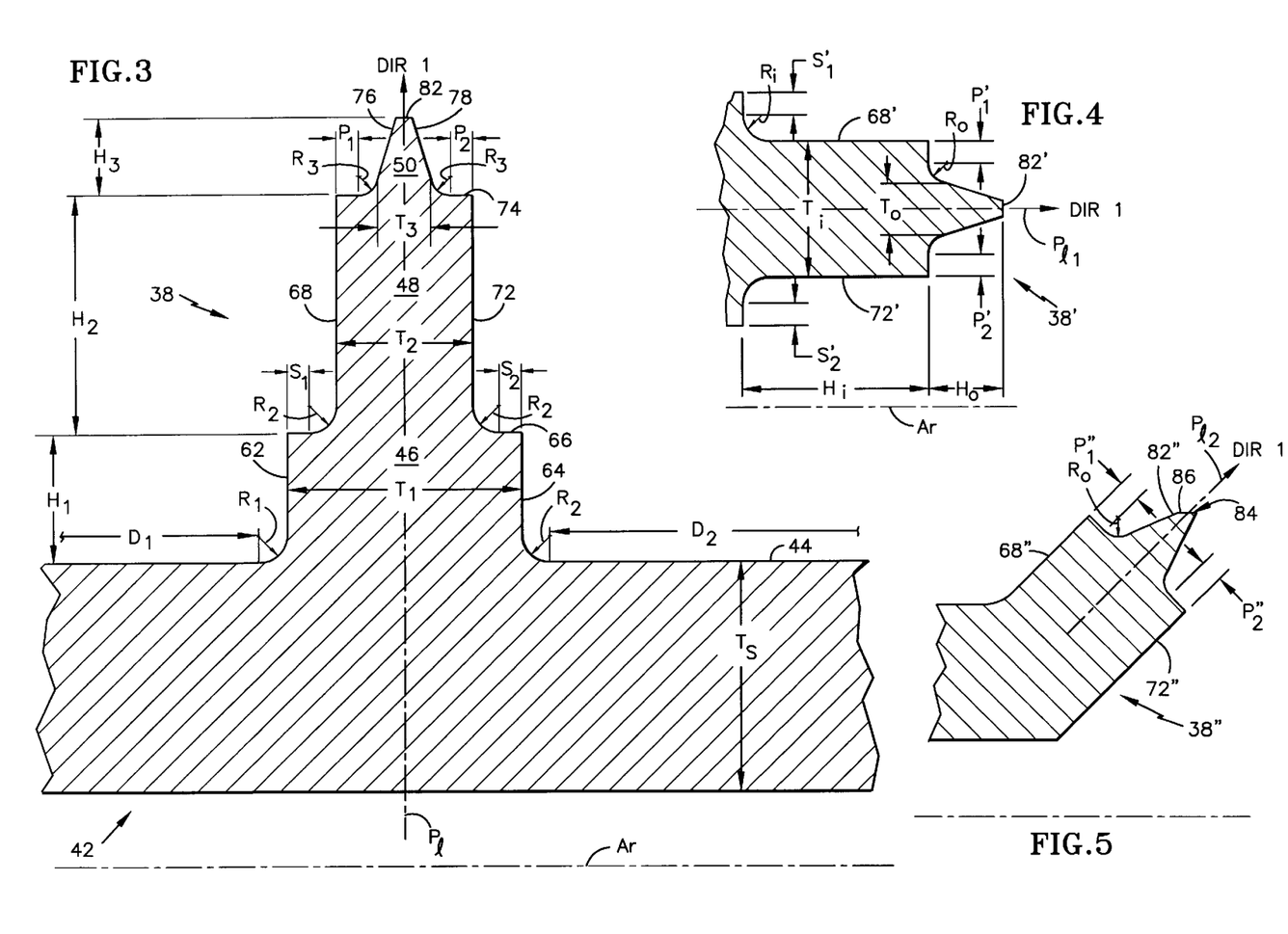
FIG. 3 is a side-elevation cross-sectional view of one embodiment of and enlarged seal element of the present invention which is taken along a flat, radial plane passing through and coincident with the axis of rotation A.
FIG. 4 is a side-elevation cross-sectional view of an alternate embodiment of the seal element shown in FIG. 3 which is taken along a flat, radial plane passing through and coincident with the axis of rotation.
FIG. 5 is a side-elevation cross-sectional view of an alternate embodiment of the seal element shown in FIG. 3 which is taken along a flat, radial plane passing through and coincident with the axis of rotation A.

FIG. 3 is an enlarged cross sectional view of a portion of the rotatable seal element 38 shown in FIG. 2. The rotatable seal element has the three stacked rings 46, 48 and 50. The first ring extends circumferentially about the axis $A_r$. The first ring extends outwardly from the surface 44 of the support member 42 in a first direction $Dir_1$ and is disposed about a circumferentially extending plane Pl, which is a ruled surface, with the first direction Dir1 extending outwardly (as shown by the arrowhead in FIG. 3) from the seat element and at the intersection of-the plane Pl with the cross-sectional view. The circumferentially extending plane in this embodiment is a plane of symmetry.

The first ring has a first side 62 which extends circumferentially and a second side 64 which extends circumferentially and parallel to the first side. The first and second sides are equally distant from the plane of symmetry. The first ring also has a first surface 66 facing in the first direction. The first surface is spaced from the surface 44 of the support member by a height $H_1$ as measured in the first direction. The first ring has a thickness $T_1$ between the first side and the second side as measured perpendicular to the circumferential direction. The thickness $T_1$ is the extent of the first surface.

The first and second sides 62,64 of the first ring are each joined to the surface 44 of the support member by a fillet radius $R_1$. The fillet radius $R_1$ is less than or equal to one third of the thickness ($R_1 \leq \frac{1}{3} T_1$) of the first ring. The surface of the support member extends laterally for a distance $D_1$ from the first side 62 of the first ring and laterally for a distance $D_2$ from the second side 64 of the first ring. The distance $D_1$ and the distance $D_2$ are each equal to or greater than one-half the fillet radius $R_1$ ($D_1, D_2 \leq \frac{1}{2} R_1$). The surface of the support member does not extend opposite to the first direction over this distance $D_1$ and $D_2$. In the embodiment shown, it is perpendicular to the direction $D_1$. In other embodiments, the surface might be inclined in the first direction. The thickness of the support member $T_S$ is greater than or equal to one-half the thickness $T_1$ of the first ring.

The second ring 48 extends circumferentially about the axis of $A_r$ and outwardly from the first surface 66 of the first ring 46. The second ring extends in the first direction and has a first side 68 extending circumferentially and a second side 72 extending circumferentially and parallel to the first side. The second ring 48 has a thickness $T_2$ between the first side and the second side as measured perpendicular to the circumferential direction. The second ring has a second surface 74 facing in the first direction which is spaced from the first surface 66 by a height $H_2$ as measured in the first direction. The second surface 74 of the second ring has a length equal to the thickness $T_2$ at a location adjacent the second surface.

The first and second sides 68,72 of the second ring are each joined to the first surface of the first ring by a fillet radius $R_2$. The fillet radius $R_2$ is less than or equal to one third of the thickness $T_2$ of the second ring at a location adjacent to the fillet radius $R_2$ ($R_2 \leq \frac{1}{3} T_2$). The first surface 66 of the first ring 46 extends laterally for a distance $S_1$ from the first side 62 of the first ring 46 and laterally for a distance $S_2$ from the second side 64 of the first ring. Each of these distances $S_1$ and $S_2$ is equal to or greater than one-half the fillet radius $R_2$ ($S_1, S_2 \geq \frac{1}{2} R_2$). The first surface over the distance $S_1$ and the distance $S_2$ does not extend opposite the first direction away from the second ring.

In alternate embodiments, the second ring might be the ring which engages the support member. In such an embodiment, the second ring would be the inner ring and the third ring would be the outer ring. The inner ring would have the same relationships to the surface of the support member as it has to the surface of the first ring. An example of such an embodiment is shown as seal element 38a in FIG. 6. Another embodiment may have more than three rings, as shown by the element 38b in FIG. 6.

The third ring 50 extends circumferentially about the axis $A_r$ and outwardly from the second surface 74 of the second ring 48 in the first direction. The third ring 50 has a first side 76 extending circumferentially and a second side 78 extending circumferentially. The first and second sides converge in the outward direction or in the first direction and have an angle between the sides that lies in a range of seven to ten degrees (7°–10°). The third ring has a third surface 82 which faces in the first direction. The third surface is spaced from the second surface by a height $H_3$ as measured in the first direction. Third ring has a thickness $T_3$ between the first side and the second side as measured perpendicular to the circumferential direction and adjacent the second surface. The ratio of the height $H_3$ to the thickness $T_3$ is less than or equal to one and one-half ($H_3/T_3 \leq 1.5$). This dimension is commonly used in the art for reasons of heat transfer during a rub. The first and second sides 76,78 of the third ring are each joined to the second surface of the second ring by a fillet radius $R_3$. The fillet radius $R_3$ is less than or equal to one-third of the thickness $T_3$ of the third ring as measured at a location adjacent the second surface. The second surface 74 of the second ring extends laterally for a distance $P_1$ from the first side 68 of the second ring and laterally for a distance $P_2$ from the second side 72 of the second ring. Each of these distances is equal to or greater than one-half of the fillet radius $R_3$. The thickness $T_3$ of the third ring 50 is greater than either the lateral distance $P_1$ or the lateral distance $P_2$ of the second surface of the second ring ($T_3 > P_1, P_2$). The second surface over the distance $P_1$ and $P_2$ does not extend opposite from the first direction and thus does not extend away from the third ring.

Figure 3A:
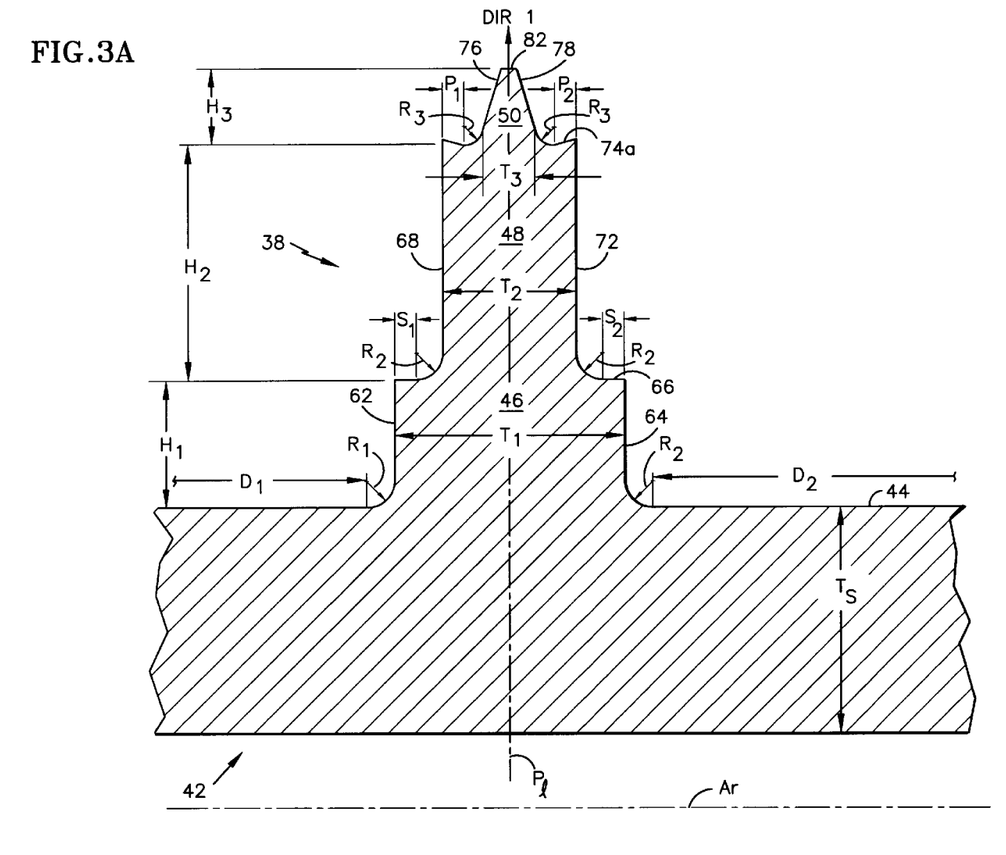
FIG. 3A is a side-elevation cross-sectional view of an alternate embodiment of the seal element shown in FIG. 3.

In an alternate embodiments as shown in FIG. 3A, the second surface 74a might extend toward the third ring and in the direction of the first direction.

FIG. 4 is an alternate embodiment 38' of the seal element 38 shown in FIG. 3 and extends in a horizontal direction such that the circumferential surface $P1_1$ is parallel to the axis of rotation $A_r$. In other respects, the embodiment shown in FIG. 4 is similar to the embodiment shown in FIG. 3 having the relationships of $H_3$ and $T_3$ and relationships between height, thickness, and fillet radiuses and flat surfaces on the surfaces of the rings. The thickness $T_o$ of the outer ring 50' is greater than either the lateral distance $P'_1$ or the lateral distance $P'_2$ of the first surface 74' of the inner ring 48' ($T_o > P'_1, P'_2$).

FIG. 5 is an alternate embodiment 38" of the rotatable seal element 38' shown in FIG. 4. The circumferentially extending surface $P1_2$ about which the seal element is disposed is inclined and angled to the axis of rotation $A_r$. In other respects, it is similar to the embodiment shown in FIG. 3 and FIG. 4 except that the outermost surface of the outer ring has extending from the outermost surface a tip 84, the tip having a surface 86 parallel to the circumferentially extending seal land 30 on the stator assembly.

Figure 6:
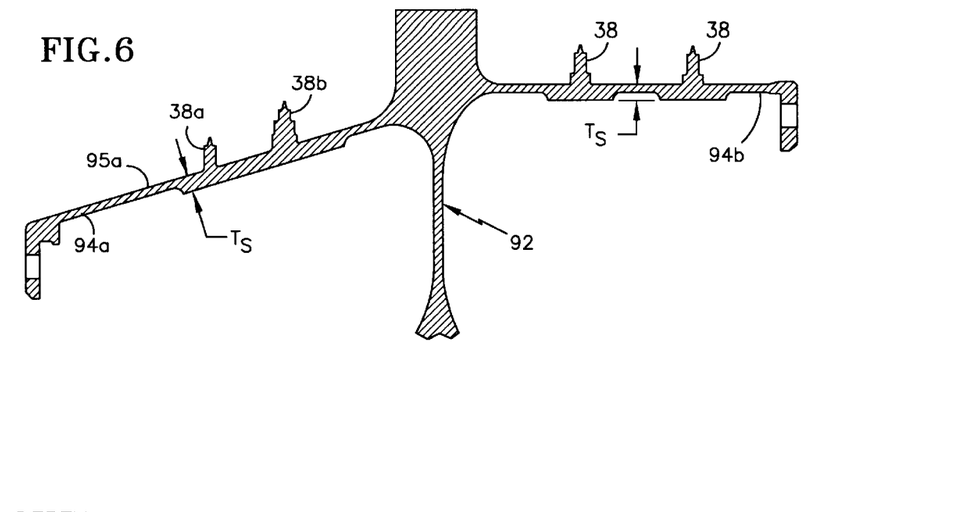
FIG. 6 is a rotor disk having a plurality of circumferentially extending seal elements.

FIG. 6 is a side elevation view of an alternate embodiment 92 of the rotor assembly 24 with portions of the assembly broken away for clarity. As can be seen the support member 94a, 94b might either be conical or cylindrical. In either event the thickness $T_S$ of the support member is measured perpendicular to the surface of the support member at a location adjacent the seal segment. The number of rings on each seal segment may be two, three or four as shown by the different embodiments 38, 38a, 38b of the seal segments shown in FIG. 6. As shown in FIG. 6, the surface 95a is inclined away from the first direction (which decreases the effect of the geometry factor on slowing growth) and the surface 95b is inclined toward the first direction (which increases the effect of the geometry factor).

Figure 7:
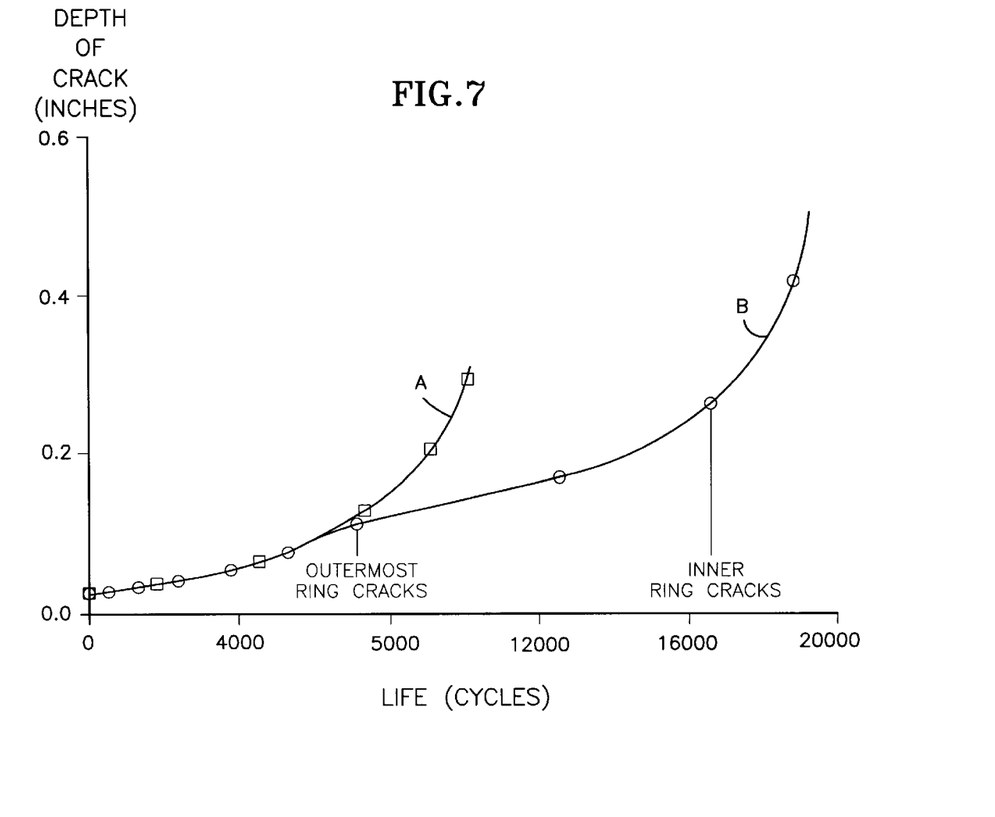
FIG. 7 is a graphical representation of the relationship between depth of crack growth versus cyclic life of one embodiment of the present invention as used in an aircraft gas turbine engine.

FIG. 7 is a graphical representation showing the relationship between the depth of a crack versus cyclic life of the seal element based on actual testing in a rotational rig. Curve A illustrates a configuration having sloped sides on the side of the knife edge. Curve B illustrates the present invention which has surfaces which are not inclined away from the first direction. As shown in curve B, the cyclic life of the present invention for the same depth of groove is nearly twice that of a configuration having a taper that has a large radius (16,000 cycles versus approximately 8,000 cycles).

Figure 8:
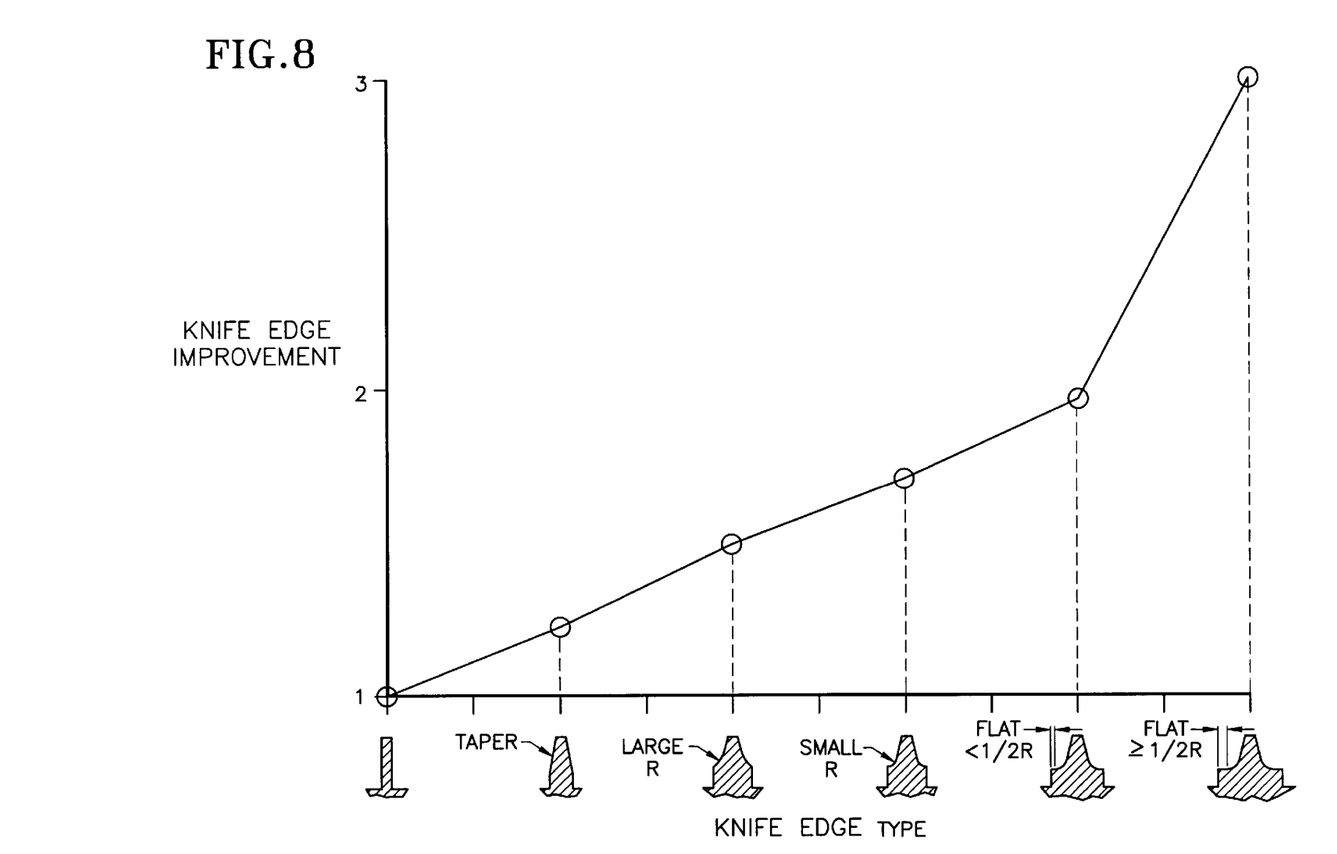
FIG. 8 is a graphical representation of the relationship between the predicted cyclic fatigue life for a seal element and the geometrical configuration between an outer ring and an inner ring.

FIG. 8 is a non-dimensional graphical comparison of cyclic life versus the configuration of the surface at the interface between the outer and the inner rings for one construction used in a gas turbine engine. For sloped sides at the transition between rings, there is a small increase in cyclic life as the slightly sloped sides are changed to greatly sloped sides (taper, large fillet R, small fillet R). Introducing a small flat (flat<½ fillet R) increases the cyclic life. As the flat approaches a figure equal to or greater than one-half of the fillet radius R, the cyclic life increases dramatically.

Figure 9:
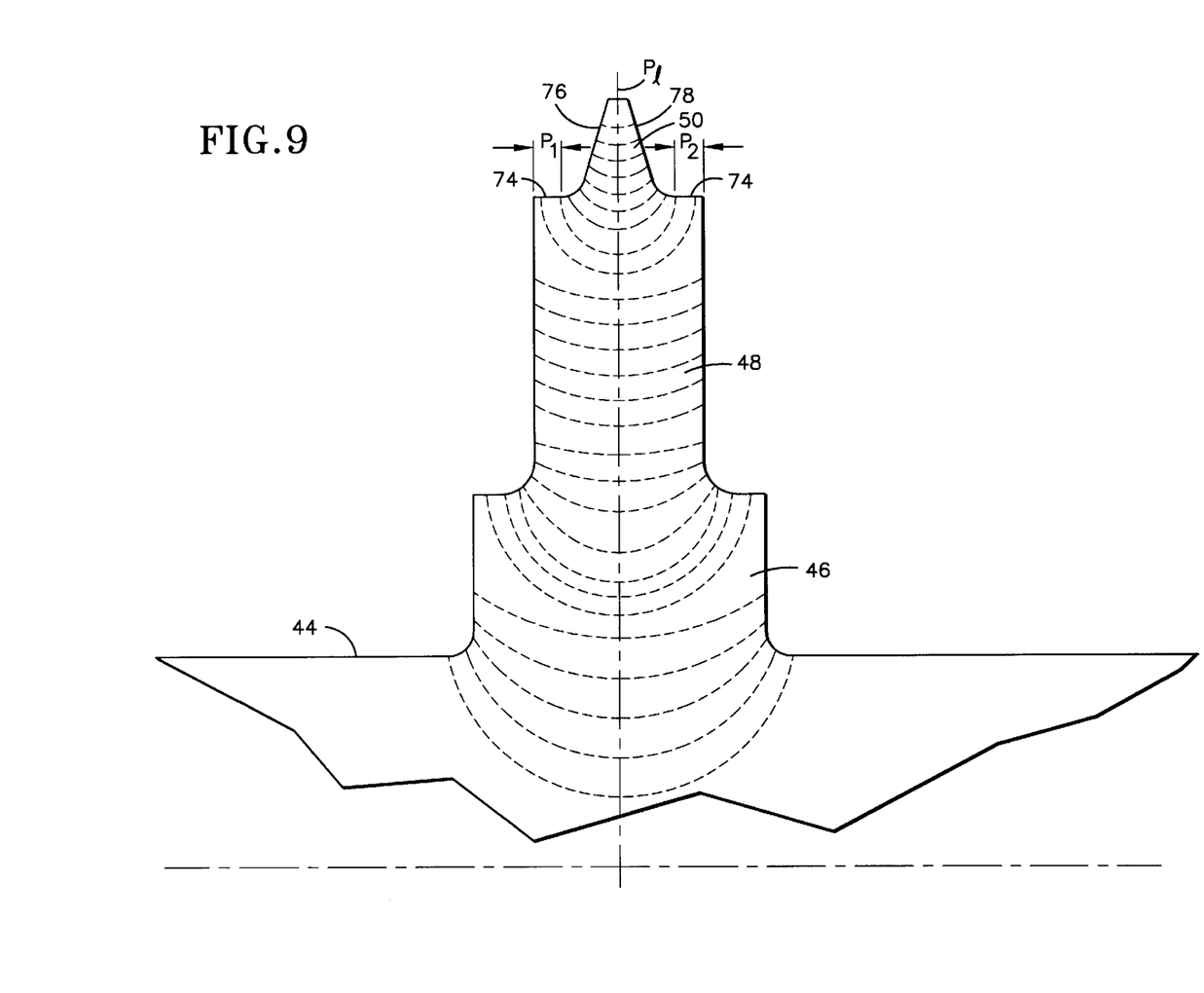
FIG. 9 is a schematic representation of the configurations of a crack front as the crack front passes through a seal element.

FIG. 9 is a graphical representation of the propagation of a crack in the radial direction as the crack grows through a knife edge seal. Each line represents the advancing crack front as it moves through the structure. As shown, the leading edge of the crack front moves along the circumferential plane of symmetry Pl.

During operation of the gas turbine engine, the rotor assembly rotates at speeds of many thousands of revolutions per minute. Hoop stresses are generated in the circumferentially continuous seal segment. As the seal segment rubs against the seal land, the rubbing friction generates heat and adds thermal and mechanical stresses to the hoop stresses. A crack will eventually form in the seal segment. The crack spreads through the outermost ring 50 (commonly called the fin ring or fin). At the time the crack reaches the upstream (first) side 76 and downstream (second) side 78 of the ring, the crack propagates very, very quickly. The crack moves quickly through the outer ring (third ring 50) to the interface with the inner ring (second ring 48).

The crack front is always perpendicular to the free surface (side 76,78) which it intersects. As a result of the flat second surface 74, the crack front assumes a marked elliptical or circular shape at the interface between the two rings. This causes the crack to grow in several dimensions dissipating the strain energy over the greater length of the crack that is available to cause the crack to grow. Thus, the geometry factor decreases the rate of crack growth and increases the cyclic life of the structure. As the crack moves downwardly into the second (inner) ring 48 (see FIG. 7, curve B) the crack front ultimately reaches the upstream and downstream sides of the inner ring. At this point, the crack assumes a shallow elliptical shape (shortening the length of the crack) and begins to move more rapidly down toward the support member. If there is an additional or (third ring) ring, crack growth proceeds in the same fashion.

As the crack reaches the support member, the crack again intersects flat areas adjacent the innermost ring, causing the crack again to assume an elliptical shape. The crack front moves radially downwardly with a circular shape because it is intersecting the flat surfaces and is perpendicular to the flat surfaces. The depth of the crack front is equal to approximately one-half the thickness $T_1$ of the innermost ring because the crack front is circular. As a result, the support member has a thickness greater than one-half the thickness of the inner ring and preferably 15 equal to or greater than the thickness $T_1$ of the inner ring. This insures the crack does not extend from the upper surface to the lower surface of the support member avoiding a through crack in this direction.

The geometry factors of the inner and outer ring (and the third ring in such configurations) at the interfaces between the radially adjacent rings causes the crack front to assume a multi-dimensional profile. The crack front must dissipate energy in all these directions, decreasing the rate at which the crack front grows. This provides an easy inspection criteria at ring interfaces and provides a margin of safety if an inspection misses the presence of a crack in a seal element. If the crack front has not progressed through the first interface, for example, between the outermost ring and the middle ring, a predictable life exists for the structure. Upon the crack front reaching the next interface between the second ring and the first ring, another predictable life exists for the knife edge. It is unlikely that the crack will not be discovered by these two inspections. Discovery of the crack results, and the rotor assembly may be removed and the repair effected without the risk of catastrophic failure. This enables inspections at spaced intervals in the cyclic life of the structure while still insuring certainty that cracks will not propagate to ultimate failure.

Although the invention has been shown and described with respect to detailed embodiments thereof, it should be understood by those in the art the various changes in form and detail thereof may be made without departing from the spirit and the scope of the claimed invention.

We claim:

1. A rotatable seal element for a rotary machine which extends circumferentially about an axis of rotation $A_r$ of the machine, the seal element having a circumferentially extending support member having a ruled surface formed by a straight line whose consecutive positions lie in the same plane such that the surface provides a reference surface which extends circumferentially about the axis $A_r$ and which is developable into a planar surface, and circumferentially extending rings each disposed about the circumferentially extending reference surface, at least one of the rings being spaced from the support member, wherein the rings include an inner ring and an outer ring and wherein the inner ring is closer to the support member than the outer ring, the rotatable seal element having a cross-sectional shape formed by the intersection of a flat plane passing through the seal element and coincident with the axis of rotation $A_r$ which comprises:

said inner ring extending circumferentially about the axis $A_r$ and outwardly from the seal element in a first direction, said first direction extending in an outward direction from the seal element and coincident with the intersection of the circumferentially extending reference surface with the flat plane passing through and coincident with the axis of rotation $A_r$, the inner ring having;

a first side extending circumferentially;

a second side extending circumferentially and spaced from the first side;

a first surface facing in the first direction which has a height $H_i$ as measured in the first direction, and a thickness $T_i$ between the first side and the second side as measured perpendicular to the circumferential reference surface adjacent the first surface;

said outer ring extending circumferentially about the axis $A_r$ and outwardly in the first direction from the first surface of the inner ring, the outer ring having;

a first side extending circumferentially;

a second side extending circumferentially;

a second surface facing in the first direction which is spaced from the first surface by a height Ho as measured in the first direction, and a thickness To between the first side and the second side of the outer ring as measured perpendicular to the circumferential reference surface at a location adjacent the first surface;

wherein the first and second sides of the outer ring are convergent toward each other in the outward, first direction;

wherein the first and second sides of the outer ring are each joined to the first surface of the inner ring by a fillet radius Ro that is not greater than one-third of the thickness $T_o$ of the outer ring; wherein the first surface of the inner ring extends laterally for a distance $P'_1$ from the first side of the inner ring and laterally for a distance $P'_2$ from the second side of the inner ring; wherein the thickness $T_o$ of the outer ring is measured at the outermost portion of the fillet radius $R_o$, and is greater than both the lateral distance $P'_1$ and the lateral distance $P'_2(T_o>P'_1, P'_2)$ and at least three times the fillet radius $R_o$; wherein the first surface over the distance $P'_1$ and $P'_2$ does not extend opposite to the first direction as the first surface extends away from the outer ring; and, wherein the geometry of the interface between the first and second rings affects the rate of propagation of a radial crack through the interface between the first and second rings.

2. The rotatable seal element of claim 1 wherein the distance $P'_1$ and $P'_2$ are each not less than one-half the fillet radius $R_o$.

3. The rotatable seal element of claim 1 wherein the first and second sides of the outer ring convergent toward each other in an outward direction have an angle between the first side and the second side that lies in a range of seven to ten degrees.

4. A rotatable seal element for a rotary machine which extends circumferentially about an axis of rotation $A_r$ of the machine, the seal element having rings disposed about a circumferentially extending surface which is a ruled surface formed by a straight line whose consecutive positions lie in the same plane such that the surface provides a reference surface which extends circumferentially about the axis Ar, the rotatable seal element having a cross-sectional shape formed by the intersection of a flat plane passing through and coincident with the axis of rotation $A_r$ which comprises:

a support member extending circumferentially about the axis $A_r$, the support member having a support surface which provides a reference for positioning the rings;

an inner ring extending circumferentially about the axis $A_r$ and extending in an outward direction from the support surface of the support member in a first direction said first direction extending in an outward direction from the seal element and coincident with the intersection of the circumferentially extending plane with the flat plane passing through and coincident with the axis of rotation $A_r$, the inner ring having;

a first side extending circumferentially;

a second side extending circumferentially and spaced from the first side;

a first surface facing in the first direction which is spaced from the support member by a height $H_i$ as measured in the first direction, and a thickness $T_i$ between the first side and the second side as measured perpendicular to the circumferential reference surface adjacent the first surface of the inner ring;

an outer ring extending circumferentially about the axis $A_r$ and outwardly in the first direction from the first surface of the inner ring, the outer ring having a first side extending circumferentially;

a second side extending circumferentially;

a second surface facing in the first direction which is spaced from the first surface by a height $H_o$ as measured in the first direction, and a thickness $T_o$ between the first side and the second side of the outer ring as measured perpendicular to the circumferential reference surface adjacent the first surface of the inner ring;

wherein the first and second sides of the outer ring are convergent toward each other in the outward, first direction;

wherein the first and second sides of the inner ring are each joined to the support surface of the support member by a fillet radius Ri; wherein the surface of the support member extends laterally for a distance $S'_1$ from the fillet radius at the first side of the inner ring and laterally for a distance $S'_2$ from the fillet radius at the second side of the inner ring; wherein the first and second sides of the outer ring are each joined to the first surface of the inner ring by a fillet radius Ro that is not greater than one-third of the thickness $T_o$ of the outer ring: wherein the first surface of the inner ring extends laterally for a distance $P'_1$ from the first side of the inner ring and laterally for a distance $P'_2$ from the second side of the inner ring; wherein the thickness $T_o$ of the outer ring is measured at the outermost position of the fillet radius $R_o$, and is greater than both the lateral distance $P'_1$ and the lateral distance $P'_2$ ($T_o>P'_1,P'_2$) and at least three times the fillet radius $R_o$;

wherein over the distance $P'_1$ and $P'_2$ does not extend opposite to the first direction as the first surface extends away from the outer ring;

wherein the geometry of the interface between the first and second rings affects the rate of propagation of a radial crack through the rings.

5. The rotatable seal element of claim 4 wherein the distance $P'_1$ and $P'_2$ are each not less than one-half the fillet radius Ro.

6. The rotatable seal element of claim 5 wherein the fillet radius Ro is not greater than one-third the thickness To of the outer ring.

7. The rotatable seal element of claim 4 wherein the laterally extending distances $S'_1$ and $S'_2$ are each equal to or greater than one-half the fillet radius Ri and the support surface of the support member over the distance $S'_1$ and $S'_2$ does not extend opposite to the first direction as the support surface of the support member extends away from the first ring.

8. The rotatable seal element of claim 4 wherein the support member has a thickness $T_S$ as measured in a direction parallel to the first direction and the thickness of the support member $T_S$ is greater than one-half the thickness Ti of the inner ring.

9. The rotatable seal element of claim 8 wherein the thickness of the support member $T_S$ is not less than the thickness Ti of the inner ring.

10. The rotatable seal element of claim 4 wherein the ratio of the height Ho to the thickness To is not less than one and one-half (Ho/To $\leq_{1.5}$).

11. The rotatable seal element of claim 4 wherein the first and second sides of the outer ring convergent toward each other in an outward direction have an angle between the sides that lies in a range of seven to ten degrees.

* * * * *